(12) United States Patent
Ur Rehman et al.

(10) Patent No.: US 11,872,778 B2
(45) Date of Patent: Jan. 16, 2024

(54) DEVICE AND METHOD FOR HANDLING SHEETS OF FIBER REINFORCED MATERIAL

(71) Applicant: Airborne International B.V., 's-Gravenhage (NL)

(72) Inventors: Moiz Ur Rehman, Rotterdam (NL); Tevfik Fikret Acer, Bergen op Zoom (NL); Mark Muilwijk, Barendrecht (NL)

(73) Assignee: Airborne International B.V., Gravenhage (NL)

( * ) Notice: Subject to any disclaimer, the term of this patent is extended or adjusted under 35 U.S.C. 154(b) by 113 days.

(21) Appl. No.: 15/733,443

(22) PCT Filed: Jan. 31, 2019

(86) PCT No.: PCT/NL2019/050061
§ 371 (c)(1),
(2) Date: Jul. 30, 2020

(87) PCT Pub. No.: WO2019/151858
PCT Pub. Date: Aug. 8, 2019

(65) Prior Publication Data
US 2021/0129460 A1    May 6, 2021

(30) Foreign Application Priority Data
Jan. 31, 2018   (NL) .................................... 2020364

(51) Int. Cl.
*B65H 29/12*      (2006.01)
*B65H 9/16*       (2006.01)
(Continued)

(52) U.S. Cl.
CPC ............. *B29C 70/54* (2013.01); *B65H 9/166* (2013.01); *B65H 29/125* (2013.01); *B65H 29/14* (2013.01);
(Continued)

(58) Field of Classification Search
CPC ...... B65H 9/166; B65H 29/125; B65H 29/14; B65H 83/02; B65H 2301/3412; B65H 2301/4212; B65H 2301/5151; B29C 70/50
See application file for complete search history.

(56) References Cited

U.S. PATENT DOCUMENTS 5,364,087 A * 11/1994 Schieck ................. B65H 31/10
                                                    271/160
5,374,053 A   12/1994 Doucet
(Continued)

FOREIGN PATENT DOCUMENTS

DE        4209496      9/1993
DE      102004031752   2/2005
(Continued)

OTHER PUBLICATIONS

International Search Report from PCT/NL2019/050061 dated Jul. 17, 2019.

*Primary Examiner* — Luis A Gonzalez
(74) *Attorney, Agent, or Firm* — Quarles & Brady LLP (57) ABSTRACT

Method of manipulating a sheet of fiber reinforced material built up with parallel longitudinally oriented fibers embedded in a thermoplastic matrix material, wherein at least one face of the sheet is engaged by a friction element that extends substantially transversely to the orientation of the fibers, and that exerts friction onto the face in a direction substantially along the orientation of the fibers. And a device for moving sheets of fiber reinforced material having parallel longitudinally oriented fibers embedded in a thermo- (Continued)

plastic matrix material, in particular sheets presenting anisotropic stiffness is disclosed. The device comprises a conveying path for conveying sheets of fiber reinforced material in a direction substantially along the orientation of the fibers, and a drive element arranged substantially transversely to the conveying path to in use engage a face of a sheet of fiber reinforced material to be conveyed along the path, and arranged to exert friction onto the face in a direction substantially along the orientation of the fibers. The device may further include a guide element arranged substantially transversely to the conveying path to in use engage the opposite face of the sheet of fiber reinforced material to be conveyed along the path, the drive element and the guide element being arranged to envelope the conveying path.

19 Claims, 4 Drawing Sheets

(51) Int. Cl.
   *B29C 70/54*   (2006.01)
   *B65H 29/14*   (2006.01)
   *B65H 83/02*   (2006.01)
(52) U.S. Cl.
   CPC ..... *B65H 83/02* (2013.01); *B65H 2301/3412* (2013.01); *B65H 2301/4212* (2013.01)

(56) References Cited

U.S. PATENT DOCUMENTS

| | | | | |
|---|---|---|---|---|
| 2010/0327519 | A1* | 12/2010 | Miyazawa | B65H 5/062 271/248 |
| 2011/0074091 | A1* | 3/2011 | Oota | B65H 7/20 271/110 |
| 2012/0103759 | A1* | 5/2012 | Koo | B65H 29/125 198/780 |
| 2014/0191465 | A1* | 7/2014 | Machamer | B65H 9/166 271/274 |
| 2015/0204476 | A1 | 7/2015 | Lazzara | |
| 2015/0367622 | A1 | 12/2015 | Adachi | |
| 2016/0096698 | A1* | 4/2016 | Schoenmakers | B65H 7/10 271/228 |
| 2018/0346271 | A1* | 12/2018 | Nakamura | B65H 5/062 |

FOREIGN PATENT DOCUMENTS

| | | |
|---|---|---|
| WO | WO 1999-016595 | 4/1999 |
| WO | WO 2001-028896 | 4/2001 |
| WO | WO 2001-083345 | 11/2001 |
| WO | WO 2014-185100 | 11/2014 |
| WO | WO 2017-019680 | 2/2017 |

* cited by examiner

Fig. 4

DEVICE AND METHOD FOR HANDLING SHEETS OF FIBER REINFORCED MATERIAL

RELATED APPLICATIONS

This application is a 35 U.S.C. § 371 national phase application of PCT/NL2019/050061 (WO 2019/151858), filed on Jan. 31, 2019, entitled "Device and Method for Handling Sheets of Fiber Reinforced Material", which application claims the benefit of Netherland Application No. 2020364, filed Jan. 31, 2018, which is incorporated herein by reference in its entirety.

The invention generally relates to handling sheets of fiber reinforced material, and in particular to handling sheets cut from fiber reinforced tape, e.g. an anisotropic unidirectional. (UD) tape.

Such sheets or 'plies' can be used for manufacturing fiber reinforced composite products. The fiber reinforced material can be supplied on relatively long and narrow tapes that are rolled up on a roll. Such tapes may e.g. be produced by impregnating a planar layer of parallel, longitudinally extending continuous fibers with a matrix material. The fibers may e.g. include carbon fibers, aramid fibers or other types of reinforcement fibers, and the matrix material may e.g. include thermosetting resin, or thermoplastic plastics material. The fiber reinforced material may be dry, but may also be wet or impregnated. In addition, the cut sheets may comprise a backing material.

Rolls of this fiber reinforced material, in particular UD tape, may be uncoiled and sections of tape or plies may be cut off from a web of uncoiled tape, e.g. transversely along the width of the relatively narrow tape, to form a sheet. The sheets can be of various shapes. They can be cut off perpendicularly to the length of the tape, so that the cut sheets have a substantially rectangular shape. Such sheets are preferred. However, the sheets can also be cut obliquely to the length of the tape, so as to form a sheet that is shaped as a triangle, trapezoid or parallelepiped, and the sheets can also be cut off with a curved cutting line. Also, the sheets may be cut out in any shape from a web of material, e.g. using a numerically controlled cutter. The sheets or plies themselves are unfinished products: they are to be stacked in layers in a stack. To form finished products, the sheets can be subjected to further processing steps, such as buffering or restacking into a stack of sheets having mutually differing orientations. A stack of sheets can then be subjected to a laminating or consolidating process, where the stacked sheets are subjected to heat and/or pressure to form a laminated product, in particular a high strength, light weight consolidated fiber reinforced product.

Sheets cut from a web of tape are typically difficult to handle due to their anisotropic properties. Strength, stiffness and rigidity are mainly provided by the reinforcement, whereas the matrix material typically binds the reinforcements together. As such, strength, stiffness and rigidity of the tape are mainly present along the fiber direction. Out of plane with respect to the fiber direction the anisotropic material has relatively low stiffness and is soft and pliable. The cut sheets are prone to fold transverse to the fiber direction and curl-up out of plane with respect to the fiber direction. Also, as the cut sheets are unfinished products, they are delicate and should be handled with care to prevent contamination, and loss of integrity. Typically cut sheets from a web of uncoiled tape are therefore picked up by hand or a planar ply picker. With manual handling integrity loss cannot always be prevented. Planar ply pickers are expensive and multiple pickers are needed to ensure a time efficient handling process.

The invention aims to alleviate at least some of the above mentioned disadvantages. In particular, the invention aims to provide a device and method for handling and sorting cut sheets from a web of uncoiled tape, with which the cost efficiency and handling speed of the cut sheets can be increased, and/or with which quality loss of the cut sheets during handling can be reduced. In particular, the invention aims to reduce handling time, to improve control of sheet handling, anchor to prevent contamination.

Thereto, the invention provides for a device for moving sheets of fiber reinforced material having parallel longitudinally oriented fibers embedded in a thermoplastic matrix material, in particular according to claim 1, comprising a conveying path for conveying sheets of fiber reinforced material in a direction substantially along the orientation of the fibers, and a drive element arranged substantially transversely to the conveying path to in use engage a face of a sheet of fiber reinforced material to be conveyed along the path, and arranged to exert friction onto the face in a direction substantially along the orientation of the fibers.

By conveying the sheets of fiber reinforced material in a direction substantially along the direction of the fibers, the tendency of a sheet cut from a web of fiber reinforced tape to curl out of plane can be reduced as the conveying force exerted on the sheet is substantially aligned with the direction of the fibers, which provide strength, stiffness and rigidity to the material. In this context, a direction substantially along the direction of the fibers is to be understood as a direction that is more along than transverse to a set of parallel fibers in the sheet. For example, in case of a sheet in which a single bundle of fibers that extends along the longitudinal axis of the sheet, friction may in accordance with this understanding be exerted along the longitudinal axis of the sheet. In case of a sheet that has a single bundle of parallel fibers that extend off-axis relative to a longitudinal axis of the sheet by less than 45 degrees, friction may in accordance with this understanding be exerted along the longitudinal axis of the sheet. In case the sheet includes a bundle of fibers that extends along the longitudinal axis of the sheet, as well as a bundle of fibers that extends transversely to the longitudinal axis of the sheet, friction may in accordance with this understanding be exerted along the longitudinal axis of the sheet. In case the sheet includes two crossing bundles of a bundle of fibers, one of which extends off-axis relative to a longitudinal axis of the sheet by less than 45 degrees, friction may in accordance with this understanding be exerted along the longitudinal axis of the sheet. These type of fiber arrangements may occur when conveying sheets with off axis, cross plied, and/or woven fibers. By arranging a drive element substantially transversely to the conveying path, it can be achieved that in use the drive element can engage a face of a sheet of fiber reinforced material to guide the sheet along the orientation of the fibers. In particular, the drive element can be arranged to exert friction onto the face across at least a part of the width of the sheet in a direction substantially along the orientation of the fibers.

By including a guide element arranged substantially transversely to the conveying path to in use engage the opposite face of the sheet of fiber reinforced material to be conveyed along the path, it can be facilitated that the sheets are enveloped between the drive elements engaging a face of the sheet and the guide elements that engage the opposite face of the sheet.

By arranging the drive element and the guide element to envelope the conveying path, movement transverse to the plane of the sheet may be limited, and a counterforce may be exerted on the sheet. In this way, the sheets can be engaged on both sides, which improves control over the sheets, whilst preventing contamination of the sheets. In particular, such enveloping may mitigate that sheets curl out of plane due to the handling forces whilst they are conveyed along the conveying path. To further improve control of the sheets, the drive and/or guide elements may extend across the conveying path and the sheets to be conveyed thereon. The enveloping may be loose in that it may form a slot that allows some movement transverse to the plane, but may also be tight so that it forms a pinch.

When the drive and/or guide element is a mantle surface of a roller or outer surface of a belt, it can be achieved that the elements move along with a sheet being conveyed on the conveying path. Thereby, the out of plane movement of the sheets during conveying can be further reduced and ply handling efficiency can be increased. In particular, when the drive element is driven to rollingly or slippingly engage the face of the sheet, the ply handing efficiency can be further increased by driving the sheet on both sides through active engagement.

The drive anchor guide element may be positioned stationary relative to the conveying path. This way, the cost efficiency of the ply handling can be improved whilst control of ply handling is enhanced and contamination is prevented.

By providing a plurality of drive and/or guide elements arranged substantially transversely to the conveying path to in use engage a face of a sheet of fiber reinforced material substantially transversely to the orientation of the fibers, the out of plane movement of the sheets during conveying can be further negated. In particular, this can be achieved when the plurality of drive and/or guide elements is arranged such that in use they can simultaneously engage a sheet to be conveyed. When the drive and/or guide elements of the plurality of drive and/or guide elements are disposed with an interspace in a row along the conveying path, the engagement with a sheet can be maintained whilst minimizing the number of drive and/or guide elements, which in turn increases the cost efficiency of ply handling. In case the plurality of drive and/or guide elements disposed on opposite sides of the conveying path are interspaced to leave a slot that allows limited free movement of the sheet to be conveyed transverse to its face, an optimum distribution of the plurality can be provided to further optimize the cost efficiency of ply handling. The stiffness of the reinforcement fibers in the direction along the fibers may then be used to bridge the gap when the sheets pass between subsequent rollers and/or guide elements along the conveying path.

By providing a guide rail extending along at least a portion of the conveying path, a lateral side of a sheet to be conveyed can be guided.

When at least one of the drive elements that is arranged to extend substantially transversely to the conveying path at an angle that is offset from the perpendicular, sheets to be conveyed can be gently manipulated to move transversely to the conveying path. When at least one of the drive elements that is arranged to extend substantially transversely to a guide rail extending along at least a portion of the conveying path, at an angle that is offset from the perpendicular, sheets to be conveyed can be gently manipulated to move towards the guide rail, e.g. to align subsequent sheets that travel along the conveying path. As an alternative, the drive element may extend perpendicular to the conveying path and/or the guide rail, but may include a helical friction pattern on a cylindrical mantle surface.

In general, by using drive and/or guide elements that are arranged to exert traction forces with a small transverse component, the sheets may be driven gently to move transversely. This way, the sheets can be positioned accurately, and aligned neatly, e.g. for efficient stacking. This is in particular relevant, as the sheets typically have insufficient stiffness transverse to the fiber orientation to accommodate or absorb a significant push force used to manipulate or control movement and alignment of the sheet. Preferably the drive elements are arranged to extend substantially transversely to the guide rail at an angle that is offset from the perpendicular with a maximum of 10 degrees offset from perpendicular, more preferably with a maximum of 5 degrees offset from perpendicular.

The device may further comprise a buffer included in or connected to the conveying path, the buffer being arranged for holding a stack of the sheets of fiber reinforced material. The sheets may be oriented and aligned in a fiber orientation. Buffering can then be used when the supply of sheets temporarily does not match the demand of sheets, e.g. when the sheets are supplied at a constant pace, but demanded at a varying pace.

By providing a guide element having a high friction surface, the guide element preferably being embodied as a roller, e.g. a cylinder, and an opposing drive element being arranged to cooperate with the guide element on opposite sides of the conveying path, a pinch can be formed through which only a single sheet to be conveyed can be driven. This way, single sheets may be selected individually for further processing steps in an efficient manner, for example as a friction feeder. When the buffer is arranged to hold the stack of sheets at an incline, the leading edge of the bottom sheet of the stack can slide out and protrude from the stack, thereby facilitating gripping or pinching of a single or individual sheet at the leading edge from the bottom of the stack. By arranging a pinch to engage a leading edge of the bottom sheet, individual sheets from the buffer can be fed to a further conveying path or tray for further processing steps.

The invention further relates to a method of manipulating a sheet of fiber reinforced material built up with parallel longitudinally oriented fibers embedded in a thermoplastic matrix material, wherein at least one face of the sheet is engaged by a friction element that extends substantially transversely to the orientation of the fibers, and that exerts friction onto the face in a direction substantially along the orientation of the fibers.

Further advantageous aspects of the invention are set out in the description and appended claims.

It will be clear to the skilled person that the technical features of the present system for handing fiber reinforced sheets can be advantageously used for handling sheets not only each alone but also in any possible combination. The technical features described in the paragraphs can be isolated from the context, and the isolated technical features from the different paragraphs can be combined. Such combinations are herewith specifically disclosed in this description.

The invention will be further elucidated on the basis of a non limiting exemplary embodiment, which is represented in the drawings. In the drawings:

FIG. 2b shows a schematic side view of the conveying path of FIG. 2a;

It is noted that the drawings are only schematic representations of a preferred embodiment of the invention. In the drawings, identical or corresponding parts are represented with the same reference numerals.

Figure 1:
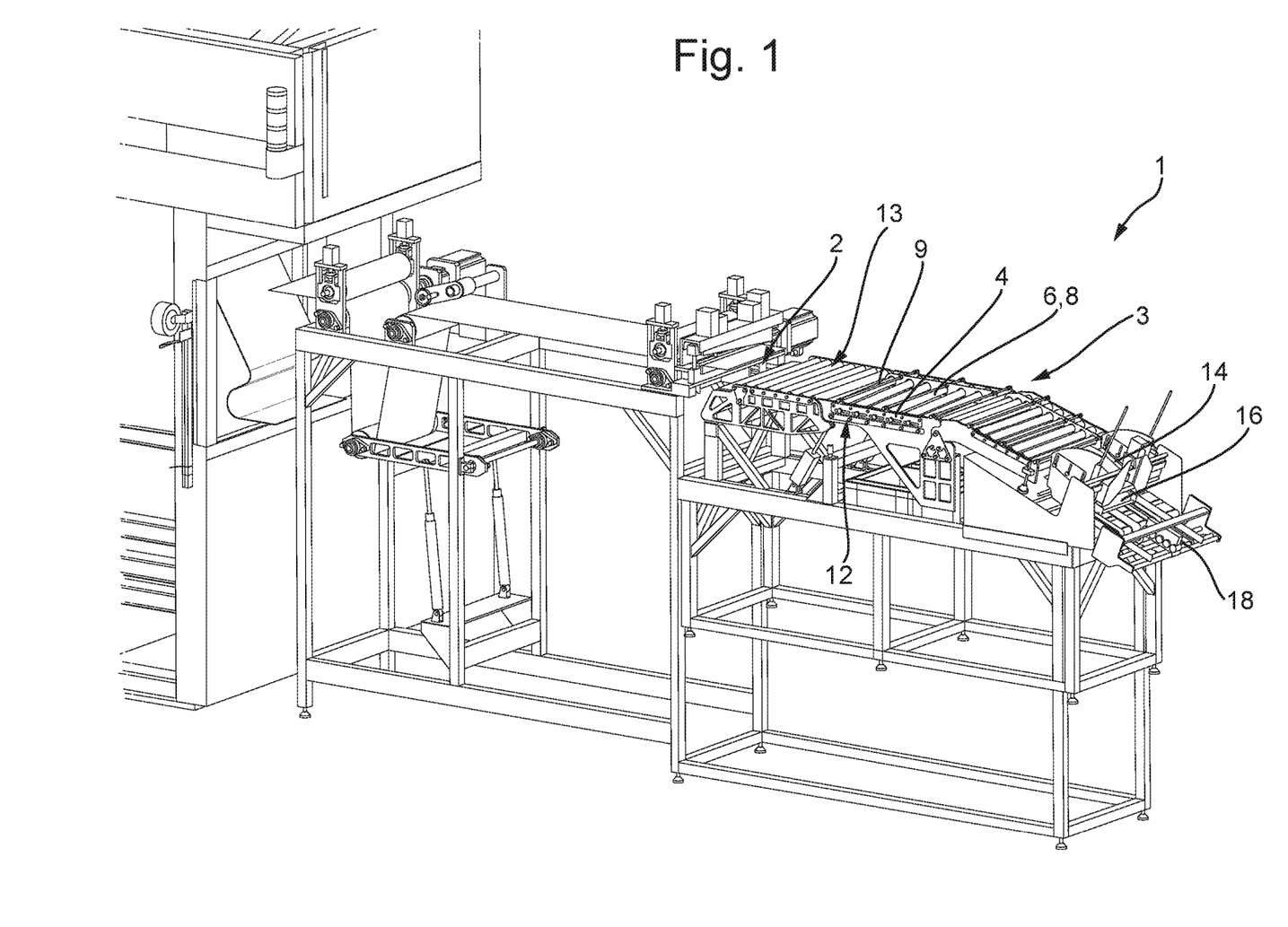
FIG. 1 shows a schematic perspective view of a device for handling sheets of fiber reinforced material, including a buffer/friction feeder.

Referring to FIG. 1, a device 1 for moving rectangular sheets 2 of fiber reinforced material having parallel longitudinally oriented fibers embedded in a thermoplastic matrix material is shown. The device 1 comprises a conveying path 3 for conveying sheets 2 of fiber reinforced material in a direction substantially along the orientation of the fibers. The device 1 further comprises a drive element 4 arranged substantially transversely to the conveying path 3 to in use engage a face 5 of a sheet 2 of fiber reinforced material to be conveyed along the conveying path 3. The drive element 4 is arranged to exert friction onto the face 5 in a direction substantially along the orientation of the fibers. Sheets 2 that e.g. have a fiber orientation at an angle with respect to the lateral sides of the sheet 2 are then still engaged substantially in longitudinal direction.

The device 1 further includes a guide element 6 that is arranged substantially transversely to the conveying path 3. In use, the guide element 6 engages the opposite face 7 of the sheet 2 of fiber reinforced material to be conveyed along the conveying path 3. Here, a plurality of drive and guide elements 4, 6 are arranged substantially transversely to the conveying path 3 to in use engage a face 5, 7 of a sheet of fiber reinforced material substantially transversely to the orientation of the fibers. Additionally or alternatively, the drive elements 4 and the guide elements 6 may also comprise or be provided with a conveyor belt (not shown here). Also, the position of (some of) the drive elements 4 and guide elements 6 may be reversed top to bottom.

Figure 2A:
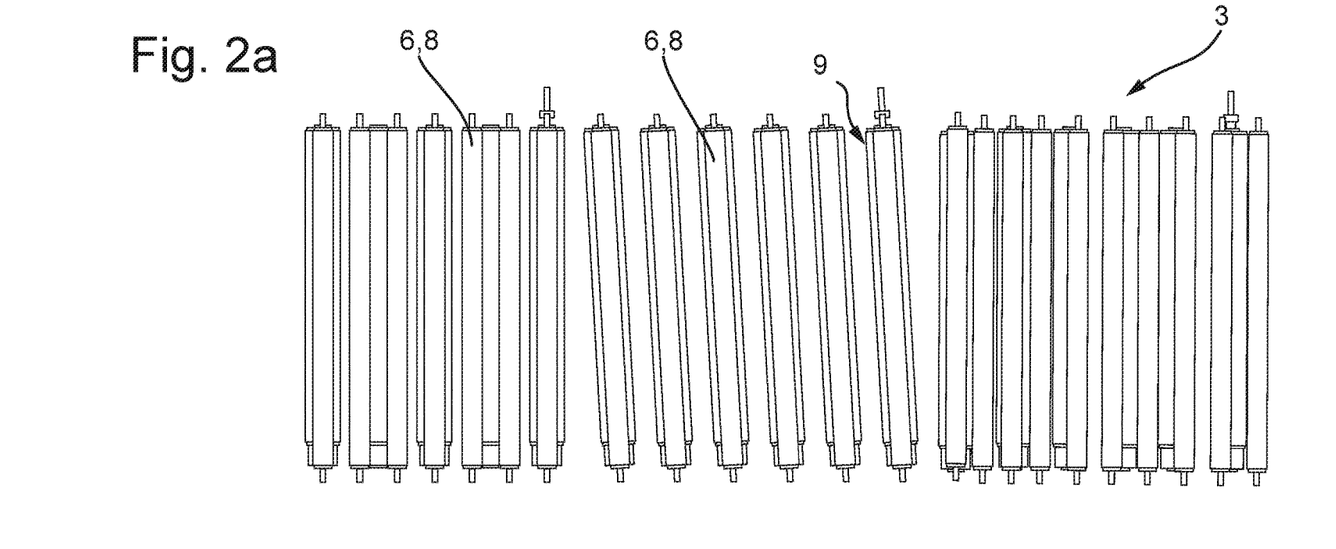
FIG. 2a shows a schematic top view of a portion of the conveying path of the device of FIG. 1.
Figure 2B:
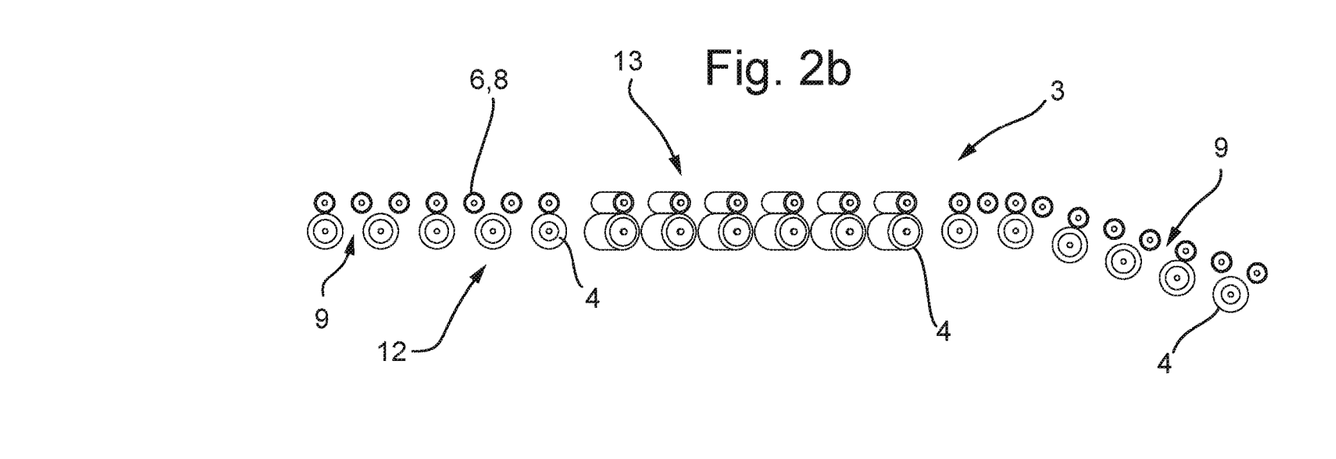

As can be seen in FIG. 2b, the drive elements 4 and the guide elements 6 are arranged to envelope the conveying path in a loose fit. By providing elements 4, 6 on both sides of the cut sheets 2 that travel along the conveying path, the sheets 2 are enveloped which enables control on both faces 5, 7 of the sheet 2. This way, the anisotropic sheets 2 may be handled more efficiently and out of plane movement, e.g. curling up or folding, of the sheets 2 can be mitigated.

Referring to FIG. 1, the drive and guide elements 4, 6 extend across the conveying path 3 and the sheets 2 to be conveyed thereon. The drive elements and/or guide elements 4, 6 extend across at least one third, preferably at least half of the width of the sheet 2, and more preferably across substantially the full width of the sheet 2. Here, both the drive element 4 and the guide element 6 is a mantle surface of a roller 8. Additionally or alternatively, the drive and/or guide element 4, 6 may be the outer surface of a belt (not shown). The drive element 4 is driven to rollingly or slippingly engage the face 5 of the sheet 2. In use, the mantle surface of a roller 8 and/or outer surface of a belt can exert a friction force on at least one of the faces 5, 7 of a sheet 2 conveyed on the conveying path 3 substantially along the orientation of the fibers. Hence, the sheet 2 can be moved, e.g. rollingly or slippingly, by traction between the drive element 4 and the face 5 of the sheet. The guide elements 6 can be positioned stationary relative to the conveying path, that is to say they may be fixed relative to the drive elements 4 and for example be provided with a smooth mantle surface that has relatively low friction. In this way, the sheets 2 to be conveyed in the conveying path 3 may still be enveloped between the drive and guide elements 4, 6 whilst the guide elements 6 remain stationary.

Referring to FIGS. 2a and 2b, the drive and guide elements 4, 6 are arranged so that in use, a plurality of chive and/or guide elements 4, 6 simultaneously engages a sheet 2 to be conveyed. In particular, the drive and/or guide elements 4, 6 of the plurality are arranged with an interspace 9 in a row along the conveying path 3. Here, the drive and/or guide elements 4, 6 of the plurality are disposed on opposite sides of the conveying path 3. It should be noted that—as can be seen in FIG. 2b—the chive and/or guide elements need not be positioned with their axis on a vertical line above each other, and that the drive and guide elements may have varying interspacing along the conveying path. The drive and/or guide elements 4, 6 are interspaced to leave a slot 10 that allows limited free movement of the sheet 2 to be conveyed transverse to its face 5, 7. By allowing limited free movement of the sheet 2, it can be achieved that the tendency of the sheet 2 to move out of plane, e.g. fold or curl, can be mitigated. Hence, control over sheet handling can be increased. Beneficially, drive and/or guide elements 4, 6 of the plurality are disposed on opposite sides 5, 7 of the conveying path 3, so that in use both faces 5, 7 of the sheet 2 are simultaneously engaged by a drive and/or guide element 4, 6.

Figure 3:
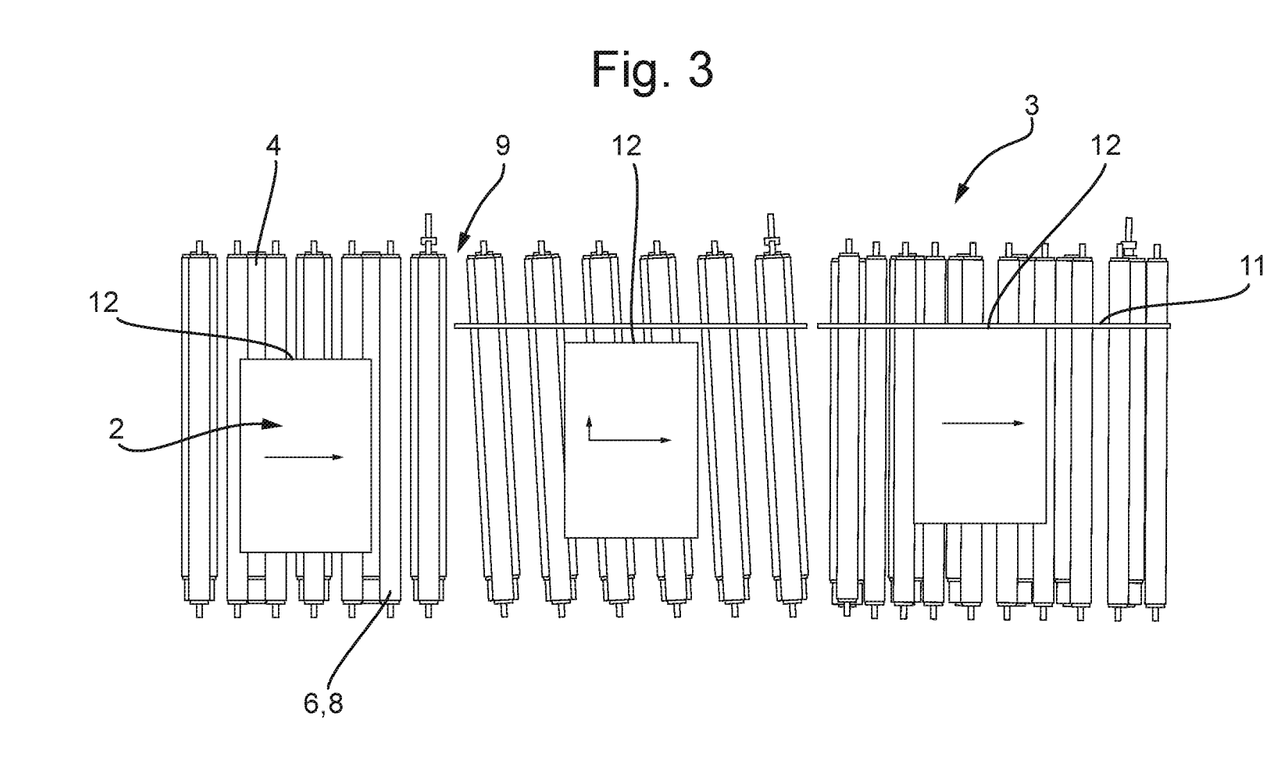
FIG. 3 shows a schematic depiction of sheets moving along the conveying path of the device of FIG. 1 and being gently aligned transversely with a guide rail extending along the conveying path.

Referring to FIG. 3, a schematic depiction of sheets 2 moving along the conveying path 3 is shown that are being gently aligned transversely with a guide rail 11 extending along the conveying path 3. For reasons of clarity the sheets 2 have been depicted on top of the drive and/or guide elements 4, 6 of the conveying path 3, whereas in reality the sheets 2 would located in the envelope between the drive and/or guide elements 4, 6. The conveying path 3 of the device 1 according to an embodiment of the invention comprises a guide rail 11 extending along at least a portion of the conveying path 3 for guiding a lateral side 12 of a sheet to be conveyed. Here, a number of the drive elements 4 are arranged to extend substantially transversely to the guide rail 11 offset at an angle from the perpendicular at about 3 degrees. The traction exerted onto the bottom face of the sheets that travel trough the envelope by the offset drive elements includes a transverse component that is small compared to a longitudinal component that extends along the conveying path 3 (see arrows in FIG. 3), that causes the sheets to gently move transversely towards the guide rail 11. Hence, the sheets 2 can be aligned along the guide rail 11 such that they can be oriented along their fiber orientation during conveying and subsequently can be positioned and aligned relatively neatly or accurately for further processing steps, such as efficient stacking. In particular, because the unidirectional fiber reinforced sheets have insufficient stiffness transverse to the fiber orientation to accommodate or absorb a push force to adequately manipulate or control movement and alignment of the sheet. The device 1 shown in FIG. 3 comprises a group of drive and guide elements 4, 6 which extend substantially transversely to the guide rail 11. The elements 4, 6 are interspaced along the conveying path 3 and are arranged in a top row 12 and a bottom row 13 to envelope the sheets 2 to be conveyed along the conveying path 3 with limited free movement transverse to their conveying face 5, 7. A plurality of elements 4, 6 in the bottom row 12 are embodied as a roller 8, specifically a cylindrical drive element. At least one of the rollers 8 extends substantially transversely to the guide rail 11 at an angle that is offset from the perpendicular. A plurality of the rollers or cylinders also extends perpendicularly to the guide rail 11 to ensure that they can be positioned and aligned relatively neatly or accurately for further processing steps, such as efficient stacking or buffering.

Figure 4:
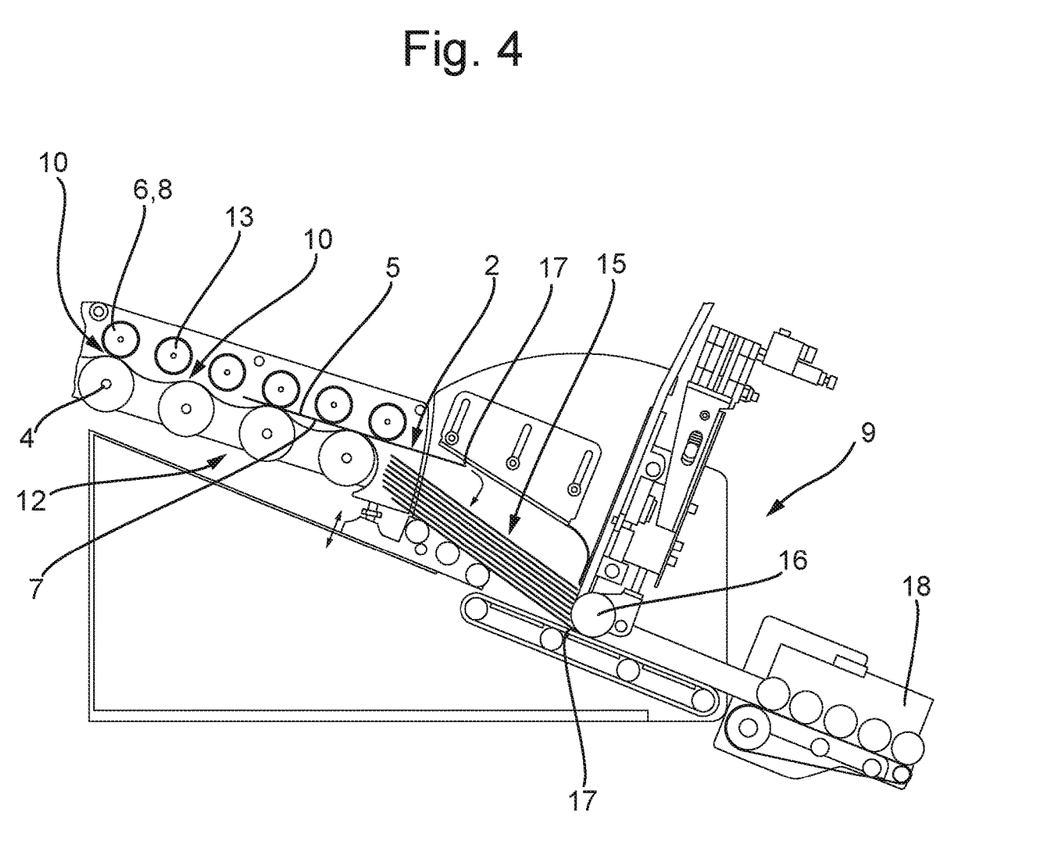
FIG. 4 shows a schematic side view of a detail of the buffer/friction feeder depicted at the end of the device of FIG. 1.

Referring to FIG. 4, the device 1 according to an embodiment of the invention further comprises a buffer 14. As can be seen, the buffer 14 is included in or connected to the conveying path 3. The buffer 14 is arranged for holding a stack 15 of the sheets 2 of fiber reinforced material. The device 1 comprises a guide element 6 having a high friction mantle surface. The guide element 6 is here embodied as a cylindrical roller 8, and an opposing drive element 4 is provided that is driven to rollingly or slippingly engage the face 5 of a sheet 2. The drive element 4 is arranged to cooperate with the guide element 6 on opposite sides of the conveying path 3 to envelope it in a tight fit, so as to form a pinch 16 through which only a single sheet 2 to be conveyed can be driven. This way, single sheets 2 may be selected individually for further processing steps in an efficient manner. Here, the buffer 14 is arranged to hold the stack 15 of sheets 2 at an incline so that a leading edge 17 of the bottom sheet of the stack 15 can slide out and protrude from the stack 15, thereby presenting the bottom sheet of the stack 15 for a pinching action. The pinch 16 is arranged to engage a leading edge 17 of the bottom sheet so as to feed or dispense individual sheets 2 from the buffer 14 to a further conveying path or tray not shown here, thereby facilitating pinching or gripping of an individual sheet 2 from the bottom of the stack 15. An output of the pinch 16 comprises a further conveying path 18. The further conveying path 18 can be for further processing steps, such as restacking of sheets 2. The combination of the buffer 14 and the pinch 16 together can be seen as a friction feeder 19 for dispensing individual sheets.

The conveying path that leads up to the buffer may include a trap door or switch portion to selectively convey sheets along different conveying paths, e.g. reject sheets to a reject bin, sheets of a secondary quality to a further buffer, or a bypass path that bypasses the buffer to allow direct further processing of a sheet.

As for the scope of this disclosure, it is pointed out that technical features which have been specifically described may be susceptible of a functional generalization. Furthermore, it is pointed out that—as far as not explicitly indicated—such technical features can be seen separately from the context of the given exemplary embodiment, and furthermore can be seen separately from the technical features with which they cooperate in the context of the example.

As for the scope of protection, it is pointed out that the invention is not limited to the exemplary embodiment represented here, and that many variants are possible. For example, other means may be applied for driving and conveying the sheets, such as a brush roll. Also, other means may be applied for gripping or pinching a single sheet from a stack, e.g. one or more friction fingers.

Such variants will be clear to the skilled person and are understood to fall within the scope of the invention as set forth in the following claims.

LIST OF REFERENCE SIGNS 1. device for moving sheets of fiber reinforced material
2. sheet
3. conveying path
4. drive element
5. face
6. guide element
7. opposite face
8. roller
9. interspace
10. slot
11. guide rail
12. bottom row
13. top row
14. buffer
15. stack
16. pinch
17. leading edge
18. further conveying path
19. friction feeder

The invention claimed is:

1. A method of manipulating a sheet of fiber reinforced material built up with parallel longitudinally oriented fibers embedded in a thermoplastic matrix material, comprising:
    engaging at least one face of the sheet by a friction element that extends substantially transversely to the orientation of the fibers, and that exerts friction onto the face in a direction substantially along the orientation of the fibers;
    engaging the opposite face of the sheet of fiber reinforced material by a guide element that extends substantially transversely to the orientation of the fibers, the guide element enveloping a conveying path; and
    wherein the friction element and guide element are disposed on opposite sides of the conveying path and are interspaced along the conveying path to leave a slot between the friction element and the guide element that allows limited free movement of the sheet to be conveyed transverse to its face;
    wherein a plurality of drive and/or guide elements is arranged substantially transversely to the conveying path to in use engage a face of a sheet of fiber reinforced material substantially transversely to the orientation of the fibers;
    wherein at least one of the drive and/or guide elements is arranged to exert traction forces with a transverse component and is arranged to extend substantially transversely to the conveying path at an angle that is offset from perpendicular and is arranged to maintain linear contact across a whole width of the sheet of fiber reinforced material.

2. A device for moving sheets of fiber reinforced material having parallel longitudinally oriented fibers embedded in a thermoplastic matrix material, in particular sheets presenting anisotropic stiffness, comprising:
    a conveying path for conveying sheets of fiber reinforced material in a direction substantially along the orientation of the fibers;
    a drive element arranged substantially transversely to the conveying path to in use engage a face of a sheet of fiber reinforced material to be conveyed along the path, and arranged to exert friction onto the face in a direction substantially along the orientation of the fibers;
    a guide element arranged substantially transversely to the conveying path to in use engage an opposite face of the sheet of fiber reinforced material to be conveyed along the path;
    the drive element and the guide element being arranged to envelop the conveying path; and
    wherein the drive element and guide element are disposed on opposite sides of the conveying path and each of the drive element and guide element is interspaced along the conveying path to leave a slot between the drive element and guide element that allows limited free movement of the sheet to be conveyed transverse to its face;

wherein a plurality of drive and/or guide elements is arranged substantially transversely to the conveying path to in use engage a face of a sheet of fiber reinforced material substantially transversely to the orientation of the fibers;

wherein at least one of the drive and/or guide elements is arranged to exert traction forces with a transverse component and is arranged to extend substantially transversely to the conveying path at an angle that is offset from perpendicular and is arranged to maintain linear contact across a whole width of the sheet of fiber reinforced material.

3. The device according to claim 2, wherein the drive and/or guide element extends across the conveying path and the sheets to be conveyed thereon.

4. The device according to claim 2, wherein the drive and/or guide element is a mantle surface of a roller or outer surface of a belt.

5. The device according to claim 4, wherein the guide element has a friction mantle surface, the guide element is embodied as a roller or cylinder, and an opposing drive element is arranged to cooperate with the guide element on an opposite side of the of conveying path so as to form a pinch through which only a single sheet to be conveyed can be driven.

6. The device according to claim 2, wherein the drive element is driven to rollingly or slippingly engage the face of the sheet.

7. The device according to claim 2, wherein the drive and/or guide element is positioned stationary relative to the conveying path.

8. The device according to claim 2, wherein a plurality of drive and/or guide elements is arranged so that in use, the plurality of the drive and/or guide elements can simultaneously engage a sheet to be conveyed.

9. The device according to claim 2, wherein the plurality of drive and/or guide elements of the plurality are arranged with an interspace in a row along the conveying path, and wherein at least some drive and/or guide elements have varying interspacing along the conveying path.

10. The device according to claim 2, wherein the plurality of drive and/or guide elements that are disposed on opposite sides of the conveying path are interspaced to leave a slot that allows limited free movement of the sheet to be conveyed transverse to its face.

11. The device according to claim 2, wherein the plurality of drive and/or guide elements are disposed on opposite sides of the of conveying path, so that in use both faces of the sheet can simultaneously be engaged by a drive and/or guide element.

12. The device according to claim 2, comprising a guide rail extending along at least a portion of the conveying path for guiding a lateral side of a sheet to be conveyed.

13. The device according to claim 12, further comprising a group of drive and guide elements which extend substantially transversely to the guide rail, and which drive and guide elements are interspaced along the conveying path, and are arranged in a top row and a bottom row to envelop the sheets to be conveyed along the conveying path with limited free movement transverse to their conveying face, and wherein a plurality of the drive and guide elements in the bottom row are embodied as a roller, and wherein at least one of the those rollers extends substantially transversely to the guide rail at an angle that is offset from perpendicular.

14. The device according to claim 13, wherein a plurality of the rollers extends perpendicularly to the guide rail.

15. The device according to claim 12, wherein at least one of the drive and/or guide elements is arranged to extend substantially transversely to the guide rail at an angle that is offset from perpendicular.

16. The device according to claim 2, further comprising a buffer included in or connected to the conveying path, the buffer being arranged for holding a stack of the sheets of fiber reinforced material.

17. The device according to claim 16, in which the buffer is arranged to hold the stack of sheets at an incline so that a leading edge of a bottom sheet of the stack can slide out and protrude from the stack.

18. The device according to claim 17, in which the pinch is arranged to engage a leading edge of the bottom sheet so as to feed individual sheets from the buffer to a further conveying path or tray.

19. The device according to claim 2, wherein at least some of the drive and/or guide elements of the plurality are not positioned with their axis on a vertical line above each other.

* * * * *